United States Patent [19]

Spaargaren et al.

[11] 3,778,725

[45] Dec. 11, 1973

[54] NON-DRIFTING HOLD-AMPLIFIER

[75] Inventors: Klaas Spaargaren; Jan Snoeks, both of Amsterdam, Netherlands

[73] Assignee: Shell Oil Company, New York, N.Y.

[22] Filed: July 6, 1972

[21] Appl. No.: 269,369

[30] Foreign Application Priority Data

July 6, 1971 Netherlands ........................ 7109293

[52] U.S. Cl. .............. 328/151, 307/235 R, 328/173

[51] Int. Cl. .............................................. H03b 3/02

[58] Field of Search ............ 328/149, 151, 162–164, 328/173, 175; 307/235

[56] References Cited

UNITED STATES PATENTS 3,390,381 6/1968 Shepard, Jr. .................... 328/151 X

*Primary Examiner*—John Zazworsky

*Attorney*—Theodore E. Bieber et al.

[57] ABSTRACT

A method and apparatus for controlling a process wherein a hold amplifier is used to maintain the charge on a capacitor, the charge on the capacitor representing the desired position of a control element. The charge on the capacitor is maintained by periodically connecting it to a reference voltage.

3 Claims, 5 Drawing Figures

NON-DRIFTING HOLD-AMPLIFIER

BACKGROUND OF THE INVENTION

The invention relates to a method of maintaining a voltage present at a capacitor (storage capacitor) and to a circuit suitable for carrying out this method.

The invention also relates to a circuit for the control of a process, in which the method according to the invention is used.

It is known to maintain the voltage present at a storage capacitor by making a correction to this voltage at suitably selected intervals, which correction is effected by repeatedly comparing the capacitor voltage with a reference voltage, which varies with time along a number of discrete levels. When a certain reference voltage level corresponds to the voltage present at the storage capacitor, the correction is made.

In a prior art circuit the difference between a stepped reference voltage and the capacitor voltage is determined; when the reference voltage exceeds the value of the capacitor voltage (i.e. when this difference becomes positive), the increase of the stepped reference voltage is interrupted and the capacitor is charged by the step value by which the capacitor voltage was exceeded.

This prior-art circuit has the drawback that it can only inhibit "leakage" from the storage capacitor. If the input current from an amplifier connected to the storage capacitor causes the latter to be "trickle-charged" rather than to "leak", the circuit is unsuitable, since it would cause the storage capacitor to "overload" at an accelerated rate instead of maintaining the original capacitor voltage. Moreover, the increase in the reference voltage has to be interrupted, with the result that the circuit can control only one storage capacitor.

The present invention relates to a method (as opposed to this prior-art circuit) in which — before the reference voltage reaches the value of the capacitor voltage and provided that the difference between these voltages has become smaller than that corresponding to a preset value — a device can be activated, with the aid of which the correction is brought about. In contrast in the prior art circuit before the reference voltage reaches the value of the capacitor voltage and after the difference between these voltages has become smaller than that corresponding to a preset value — a charging device for the storage capacitor is activated.

However, this prior-art circuit also has the drawback that only leakage of the storage capacitor can be remedied. If it is possible for the storage capacitor to be trickle charged, this circuit is also unusable. Since the use of this circuit invariably involves raising the capacitor voltage to above the reference voltage level corresponding to the original capacitor voltage, the tendency to trickle charge would immediately result in overloading of the storage capacitor.

SUMMARY OF THE INVENTION

According to the invention the correction is made by connecting the reference voltage or a voltage derived therefrom to the storage capacitor via a switch element permitting passage of current in both directions, the switch element being closed before the reference voltage reaches the value of the capacitor voltage, as soon as the difference between these voltages has become smaller than a predetermined threshold value, which does not exceed a value corresponding to half the interval between two successive levels of the reference voltage, and the time during which the switch element remains closed being longer than the rise time of the reference voltage between two successive levels, but shorter than the duration of one voltage level.

Preferably, the reference voltage used is a periodically repeating stepped voltage.

The threshold value is suitably selected slightly smaller than the said half interval.

The opening of the switch element is preferably independent of the difference between the reference voltage and the capacitor voltage; the duration of the closure of the switch element is often selected considerably shorter than the duration of one voltage level of the reference voltage.

The method according to the invention ensures that the capacitor retains its voltage irrespective of whether it is being discharged or charged.

In the method according to the invention, the reference voltage may, but need not be interrupted after it has exceeded the value of the capacitor voltage.

If the reference voltage is not interrupted but continues, it is possible to have more than one storage capacitor controlled by the same correcting device.

In general, the correction is made by the reference voltage itself; however, it is also possible to use for this purpose a voltage which is derived from the reference voltage and hence varies similarly with time.

An apparatus (hold amplifier) for carrying out the method according to the invention preferably comprises:

a. a first differential amplifier, the output of which is fed back into one of two inputs;
b. a storage capacitor which is connected to the other input of the said differential amplifier;
c. a reference voltage source, capable of supplying a voltage, which varies with time along a number of discrete levels;
d. a second differential amplifier, one input of which is connected to the output of the first differential amplifier and the other input to the reference voltage source;
e. a switch element permitting passage of current in two directions and capable of connecting the reference voltage source or a voltage derived therefrom to the storage capacitor;
f. a device (threshold value detector) connected to the output of the second differential amplifier, the output of the said detector being connected to the switch element.

The differential amplifiers have a relatively high input impedance and relatively high amplification factor.

The threshold value detector which can be set to a threshold value corresponding to at most half the interval between two subsequent levels of the reference voltage, is preferably formed by a Schmitt trigger followed by a pulse generator.

The pulse generator transmits a pulse to the switch element as soon as the reference voltage approaches the capacitor voltage and the difference between these two has reached a value corresponding to the threshold value of the Schmitt trigger, as a result of which the Schmitt trigger is activated.

The length and or the shape of the pulse transmitted by the pulse generator to the switch element can, if necessary, be preset and/or controlled. The length of this pulse usually determines the length of time during which the switch element remains closed. This time is always shorter than the duration of one voltage level of the reference voltage and usually short in comparision with it.

DESCRIPTION OF THE DRAWINGS

The method according to the invention and especially the hold amplifier according to the invention will now be explained in more detail with reference to the drawings in which.

In practice the maintenance of a voltage occurs, for example, in the control of a process. In effecting such control a number of process variables are usually measured,such as temperatures, pressures, flow rates and product properties, and a number of process variables (such as material flows and heat flows) are controlled according to the measured values. The measured values are usually received as electrical voltages.

By connecting the source of such a voltage with a storage capacitor the value of the voltage can be retained. The capacitor voltage continuously forms a measure of the measured value of the process variable. If, however, the source is disconnected from the capacitor, then the value of the capacitor voltage forms a measure of the value of the variable measured at the time of the disconnection. Without taking special precautions, however, the voltage of the capacitor will not maintain this last-mentioned value. A hold amplifier according to the invention is capable of ensuring that the capacitor voltage continues to hold the same or at least substantially the same value.

Figure 1:
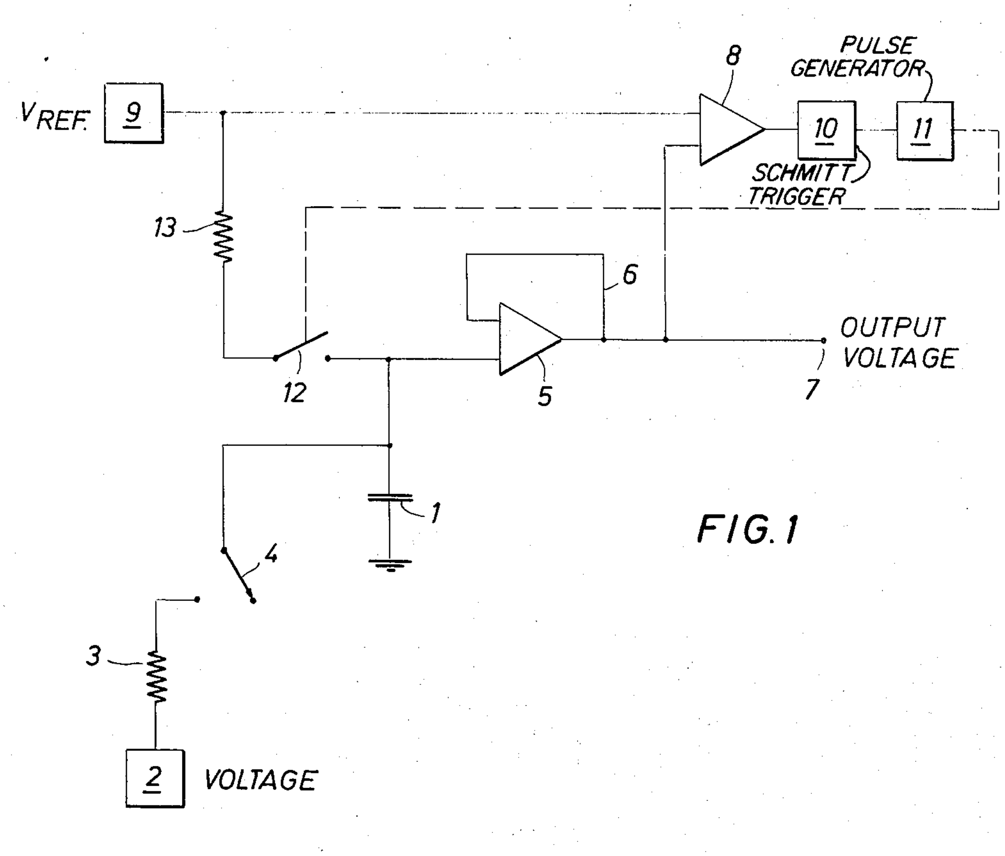
FIG. 1 shows a block diagram of the hold amplifier according to the invention with a storage capacitor.

The said source of the voltage to be retained is indicated in the FIG. 1, by the reference numeral 2; this source can be connected to the storage capacitor 1 via an impedance (usually a resistor) 3 and a switch device 4.

In order to ensure continuous maintenance of the voltage at the storage capacitor 1, the following procedure is followed according to the invention.

The capacitor 1 is connected to one of the two inputs of a differential amplifier 5. The output of this differential amplifier is fed back to the other input by a line 6. In this way it is possible to equalize the output voltage 7 of the differential amplifier 5 with the input voltage, and hence with the voltage of the capacitor. The voltage 7 can be used for a variety of purposes.

A second differential amplifier 8 is connected by one input to the output of the amplifier 5 and by the other input to a source of reference voltage 9.

The differential amplifiers used had an input resistance, which was in the range of $10^{10}$ to $10^{12}$ ohms; the amplification factor (without negative feedback) was about $10^5$.

The reference voltage 9 varies with time along a number of discrete levels; it is preferably a stepped voltage running from a minimum to a maximum value, then falling back to the minimum value and rising again, etc. The repetition of the depicted variation is usually periodic. The differential amplifier 8 amplifies the difference between the two voltages 7 and 9. The output of the differential amplifier 8 is connected to a threshold value detector, consisting, of a combination of a Schmitt trigger 10 and a pulse generator 11. The pulses from the pulse generator operate a switch element 12 permitting the passage of current in two directions and connected between the source of the reference voltage 9 and the storage capacitor 1. In the circuit from the source 9 to the capacitor 1 there is usually an impedance (generally a resistor) 13.

As long as the switch device 4 is in the left-hand position, not shown, the voltage of the capacitor 1, follows the voltage which is supplied by the source 2. If the switch device is set to the right-hand position, the capacitor voltage forms the voltage to be maintained by the storage amplifier.

The differential amplifier 8 amplifies the difference between the two voltages 7 and 9; when this difference becomes smaller than a certain threshold value, the threshold value detector 10/11 is activated and supplies a signal which causes the switch element 12 to close.

The source of the reference voltage 9 is then connected to the storage capacitor 1 via the resistor 13 and the switch element 12. A short time later (i.e. shorter than the duration of one voltage level of the reference voltage) the switch element 12 opens again.

In the special embodiment shown, 10 is a Schmitt trigger with a monostable multivibrator. The trigger operates at a certain threshold value and ensures that the pulse generator 11 generates a pulse which closes the switch element 12. The duration of the pulse is adjustable and is so selected that the switch element 12 opens again before the duration of the voltage level of the reference voltage comes to an end.

The working of the circuit as shown in FIG. 1 will now be explained with reference to FIGS. 2 and 3.

Figure 2:
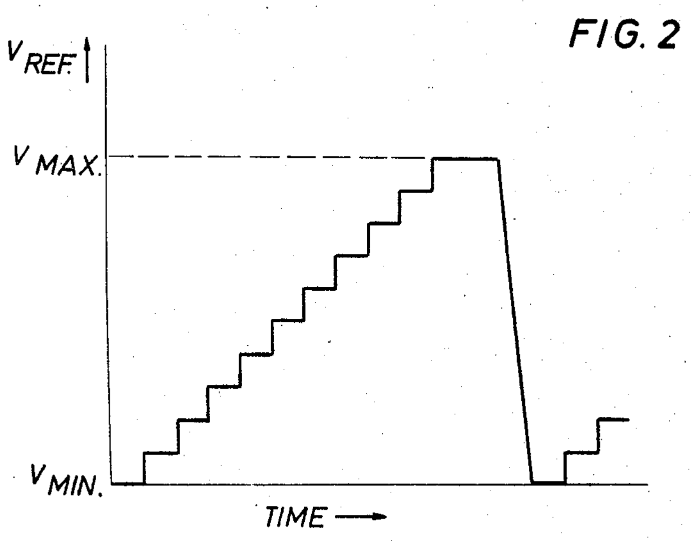
FIG. 2 is a wave form of the reference voltage.

The variation of the reference voltage $V_{ref}$ with time is diagrammatically shown in FIG. 2. In general a stepped voltage is used, which periodically increases from a minimum value $V_{min}$ (selected equal to 0 in this case) to a maximum value $V_{max}$. The range $V_{min}$ to $V_{max}$ covers the voltage $V_c$ to be expected in the capacitor 1.

The range $V_{min}$ to $V_{max}$ can also begin at a negative voltage value, for example, and increase through 0 to a positive value. The reference voltage can also have a decreasing, stepped characteristic.

The transitions from one level to the next are usually very abrupt; the fall in the voltage after $V_{max}$ has been reached also takes place very rapidly as a rule (with a decreasing characteristic of the stepped voltage the same naturally applies to the sudden rise from $V_{min}$ to $V_{max}$). The rise time of a step can, for example, be between $10^{-3}$ and $10^{-6}$ seconds.

As an example FIG. 2 shows ten steps between $V_{min}$ and $V_{max}$ each lasting 1 second. In practice many more steps, for example 100 steps, with a duration of 100 seconds will normally be used. The duration of one period of the reference voltage is selected in accordance with the expected change in voltage in the capacitor 1.

As the rate of leakage or trickle-charging of the capacitor increases so the reference voltage should be made to vary more rapidly. The cycle can last 10 seconds, for example, and the duration of one voltage level of the stepped increase will then be about one-tenth second.

Figure 3:
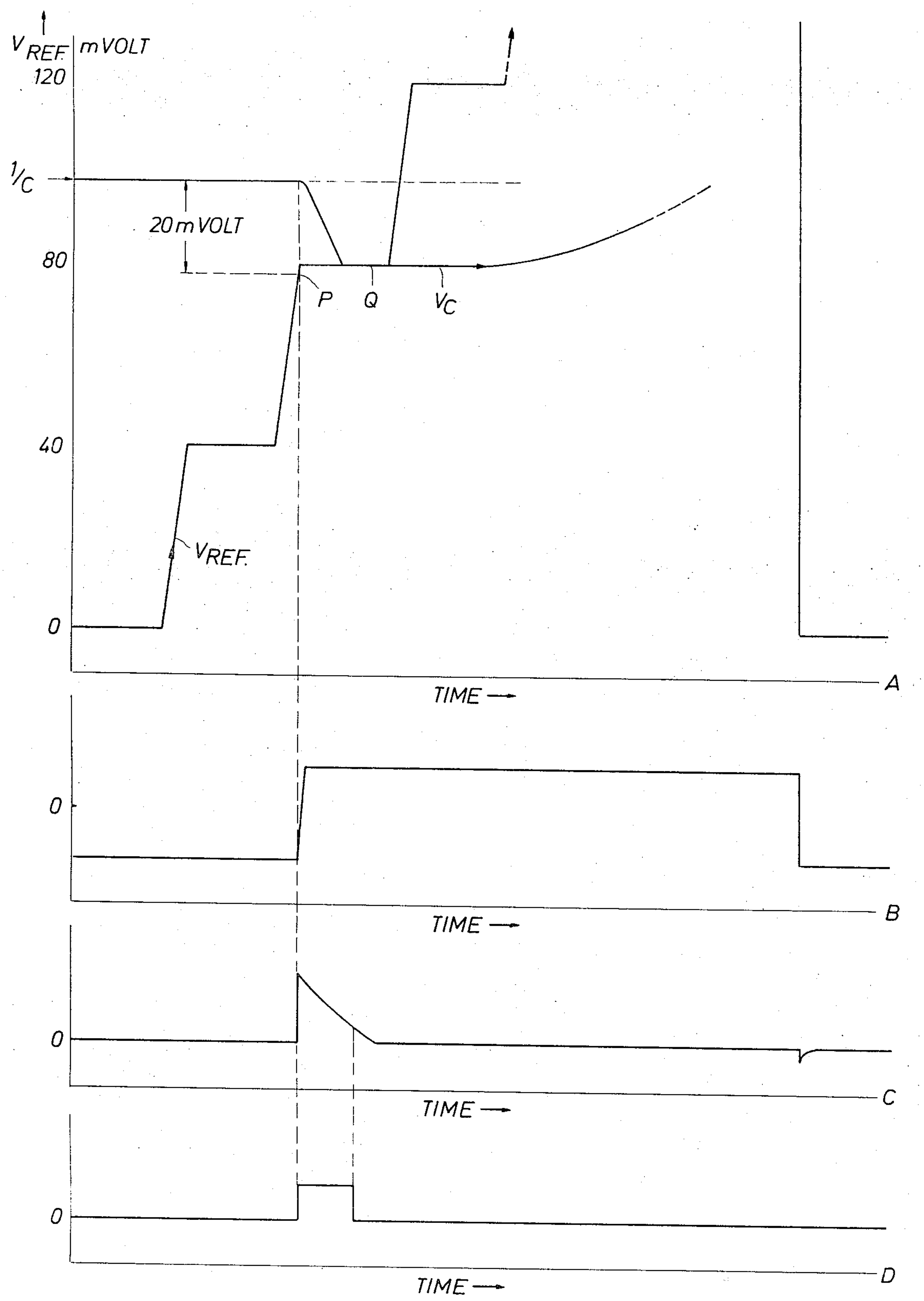
FIG. 3A–D are a series of wave forms of various voltages in the circuit of FIG. 1.

FIG. 3 gives in more detail what in fact happens. The top part A again represents the variation of the reference voltage $V_{ref}$ with an exaggeratedly slow rise time between the levels.

It was assumed that each step represented an increase in the reference voltage of 40 mV and that the capacitor voltage was 98mV. The amplification factor of the differential amplifier (with negative feedback) was 300 and the threshold value to which the Schmitt trigger was set was somewhat less than 6 V. As soon as the reference voltage $V_{ref}$ has approached to within somewhat less than 20 mV (half the height of a step) of the capacitor voltage $V_c$ (the point P), the Schmitt trigger begins to operate (see FIG. 3B).

The pulse generator 11 feeds a pulse-shaped signal (see FIG. 3C) to the switch element 12. The switch element 12 closes (see FIG. 3D) and the capacitor voltage $V_c$ is returned from the original value of 98 mV to the voltage 80 mV of the level Q of the reference voltage. Before the level Q ends, the switch element is open again and the capacitor voltage is left to itself for one period of the reference voltage. The capacitor voltage $V_c$, as shown in FIG. 3A, is inclined to trickle-charge and to return to the old level of 98 mV. At the next approach of $V_{ref}$ from the minimum value (in this case 0 Volt) $V_c$ is again returned to the level Q.

However, should the storage capacitor leak and assume a value lower than the level Q, the capacitor voltage will be raised again to the level Q provided that the voltage has not dropped below about 61 mV (based on the assumed values of FIG. 3).

From the above it will be clear that the hold amplifier according to the present invention is capable of maintaining both leaking and trickle-charging capacitors at their original voltage or at least substantially at this voltage for an arbitrarily long period of time. As has already been said, the accuracy to which one wishes the maintain the original voltage can be set at will be selecting the height of the steps and the cycle time of the reference voltage.

As soon as the Schmitt trigger has operated, an extra connection (not shown) between the output of the Schmitt trigger and the input of the differential amplifier 8 ensures that no further spurious activity in the circuit can take place (for example as a result of small interference signals on $V_c$ or $V_{ref}$ such as hum or noise). When the reference voltage decreases the switch element 12 does not operate; the pulse generator would produce a negative pulse in this case, and the switch element 12 only reacts to positive pulses. Moreover, a diode (not shown) ensures that the negative pulse is suppressed.

The invention also relates to a complete circuit for the control of a process, in which a digital computer is used which receives one or more signals referring to measured process variables and which supplies one or more signals intended for controlling one or more process variables. In such circuits it is advantageous to use a number of hold amplifiers according to the invention.

In the first circuit the storage capacitor of the hold amplifier used receives the voltage to be maintained from an output of the computer or, in other words, as an output signal from the computer; however, only as long as the computer is functioning, which in the event of computer failure the connection between the storage capacitor and the computer is broken; furthermore, the output of the first differential amplifier of the hold amplifier is connected to a correcting unit for the process variable to be controlled. This circuit will be discussed in detail hereinafter with reference to FIG. 4.

In the second circuit a signal supplied to the input of the computer is also supplied — as the voltage to be maintained — to the storage capacitor of the hold amplifier; however, only as long as the computer is functioning, while in the event of computer failure the connection between the storage capacitor and the source of the signal supplied is disconnected; this last-mentioned source also being connected to one of the two inputs of a subtracting element of which the other input is connected to the output of the hold amplifier; the output of the subtracting element also being connected to one input of another hold amplifier, of which the other input — only as long as the computer is functioning — is connected to the output of the computer (which output can supply a signal for controlling a particular process variable), the output of the latter hold amplifier being connected to a correcting unit for controlling this particular process variable.

This second circuit will be discussed in detail hereinafter with reference to FIG. 5.

Figure 4:
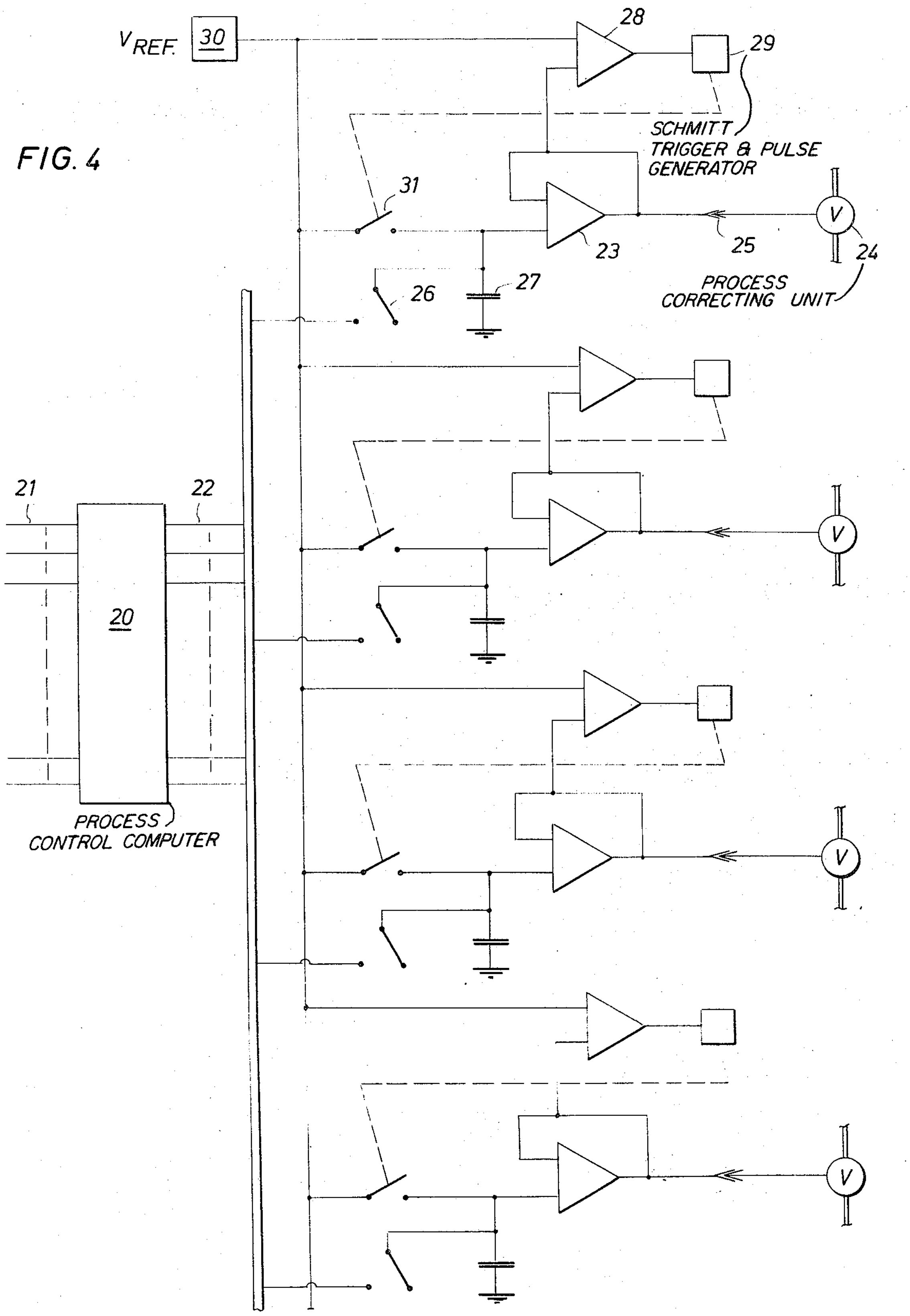
FIG. 4 is a block diagram of a control system using a plurality of the hold amplifiers shown in FIG. 1.

In the first-mentioned circuit (see FIG. 4) for the control of a process by so-called direct digital control the computer designated by 20 receives, at its inputs 21, signals from one or more meters of process variables. The computer processes these signals according to a predetermined program for each individual signal and subsequently successively supplies signals at its outputs 22 to connecting units 24 for controlling the relevant process variables. For a relatively short time each of the outputs 22 of the computer thus periodically receives a signal intended for the correcting unit corresponding to the output in question. In the event of computer failure it is desirable to switch over to emergency control loops which allow the process to continue as well as possible for the duration of the computer failure. To this end use can be made of hold amplifiers 23, which have already been provided at each correcting unit 24 in order to hold the correcting unit concerned in the desired position while the computer is occupied with supplying signals to the other correcting units. These hold amplifiers may be hold amplifiers according to the invention. FIG. 4 shows four identical emergency control loops. A large installation may comprise 200 of them, for example, The voltage at the output terminal 25 of a hold amplifier 23 is used to adjust the relevant correcting unit 24. As long as the installation is being controlled by the computer 20, the switch devices 26 are in the left-hand position, not shown; these switch devices 26 correspond to the switch devices 4 in FIG. 1, and the output of the computer corresponds to the voltage source 2 in FIG. 1. If the relevant output 22 in the computer is briefly connected up, the voltage across the capacitor 27 and the voltage at the terminal 25 follow the voltage given by the output. During the time between two events of the relevant output 22 of the computer 20 being connected the voltage at terminal 25 remains constant as long as the voltage of the capacitor 27 (which has the same function as the capacitor 1 in FIG. 1) remains constant. The interval between two events of the relevant output being connected is so short that it is generally hardly if at all necessary to maintain that voltage at a constant value.

If the computer 20 fails, the switch devices 26 automatically change to the right-hand position, in other words, the position in which they are disconnected from the computer 20. By the hold amplifier according to the invention the voltages across the capacitors 27 and hence the positions of the correcting units 24 are kept constant irrespective of the duration of the failure. The components 28, 29, 30 and 31 correspond to the components designated by the reference numerals 8, 10/11, 9 and 12, respectively, in FIG. 1. In this case the emergency control loops consist of hold amplifiers according to the invention. The process, which previously was directly controlled by a digital computer, is now no longer controlled but maintained in the last condition determined by the computer.

Figure 5:
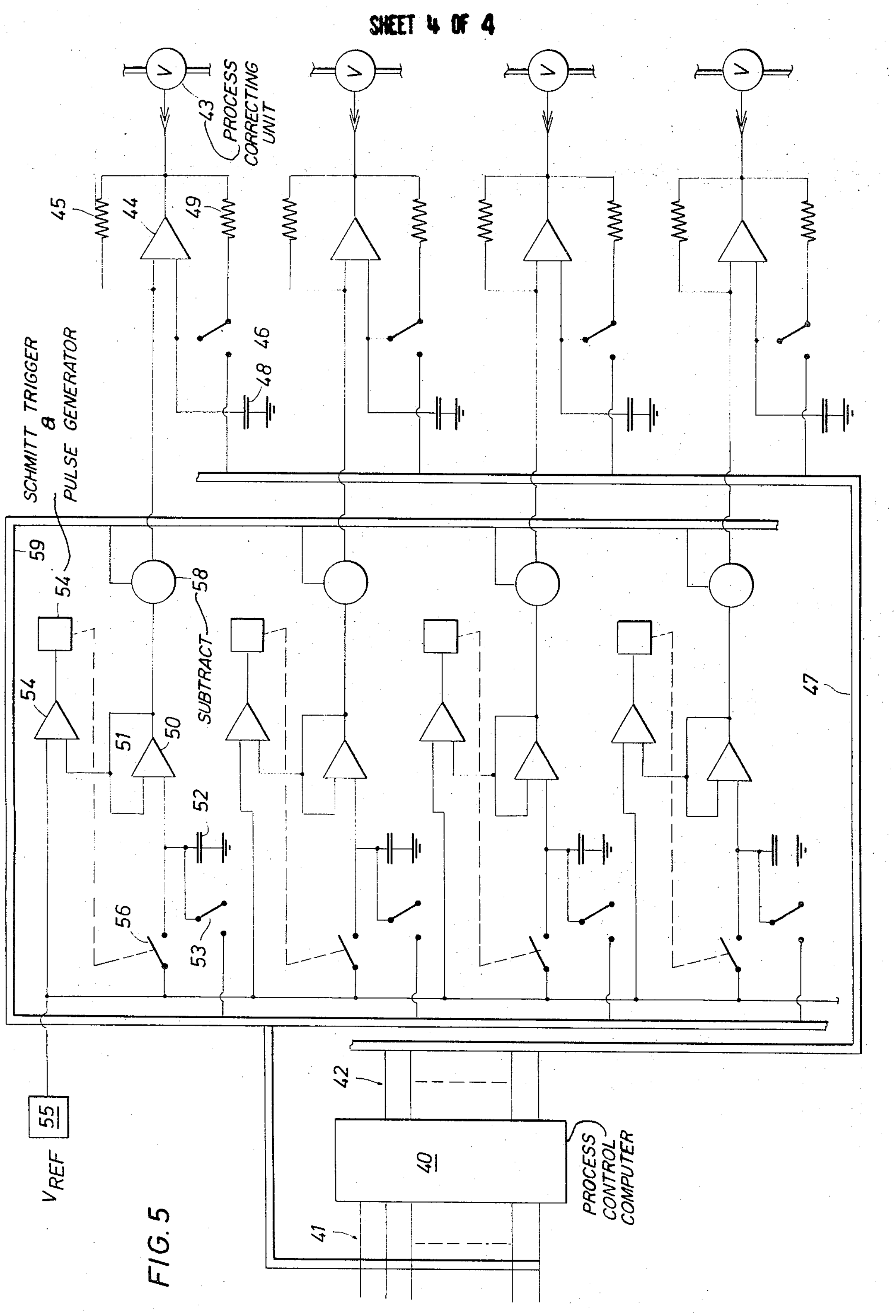
FIG. 5 is a block diagram of the control system of FIG. 4 and in addition including means for bypassing the control computer in case of failure of the computer.

The second circuit is shown in FIG. 5. In this Figure, 40 is a digital computer. The lines 41 schematically show the connections to measuring instruments which measure the process variables,for example, temperatures, pressures, flow rates and product properties. In a large installation 200 measuring points, for example, may be involved. The lines 42 schematically show the outputs of the computer. When digital computers are used for controlling process variables, conventional controllers can be omitted. FIG. 5 shows four circuits for controlling four process variables; these circuits are identical.

Each correcting unit 43 for controlling a process variable is provided with a hold amplifier 44 with feedback 45. Switch devices 46 connect the outputs 42 of the computer with the hold amplifier. With direct digital control the switch devices 46 are in the left-hand position, not shown. The signals from the computer 40 then pass via the outputs 42 and the lines 47 to the amplifiers 44. Hold capacitors 48, which are also connected to the hold amplifiers, are then charged to a voltage equal to or proportional to the relevant output voltage of the computer 40. Each feedback amplifier 44 with a capacitor 48 is a hold amplifier which ensures that the correcting unit 43 remains in the same position in which it was set when the relevant output signal from the computer 40 was supplied up to the moment that an output signal from the computer is again supplied.

If, in the event of failure, the computer 40 fails, the switch devices 46 change to the right-hand position as shown. An impedance 49 is now connected to the circuit, as a result the amplifier 44 becomes a controller with a characteristic determined by the feedbacks. Hold amplifiers according to the invention are included in each control circuit.

The components designated by the reference numerals 50, 51, 52, 53, 54, 55, 56 and 57 in FIG. 5 correspond to the components indicated by 5, 6, 1, 5, 8, 9, 12 and 10/11 respectively in FIG. 1. In the case of direct control the switch devices 53 are in the left-hand position, not shown. Elements 58 subtract the two incoming signals from each other — i.e. the output voltage of the amplifier 50 and the measured value signal supplied via a line 59, which is also supplied to the input 41 of the computer 40. The difference is supplied to the hold amplifier 44. As long as the computer is functioning, the switch devices 53 remain in the left-hand position and the output voltage of each element 58 is equal to 0. For under these conditions the two signals arriving at element 50 are equal to the same measured value signal.

In the event of failure of the computer 40 the switch elements 53 change to the right-hand position. The output signal of the amplifier 50 now remains constant for an indefinite time and this signal serves as set value for the emergency control loop now in operation for the relevant correcting unit 43.

We claim as our invention:

1. An apparatus for maintaining a voltage present on a capacitor comprising:

a first differential amplifier, the output of which is fed back into one of the two inputs of said first differential amplifier;

a storage capacitor connected to the other input of the said differential amplifier;

a reference voltage source capable of supplying a voltage which varies with time along a number of discrete levels;

a second differential amplifier one input of which is connected to the output of the first differential amplifier and the other input to the reference voltage source;

a switch element permitting the passage of current in two directions and capable of connecting the reference voltage source to the storage capacitor;

a threshold value detector connected to the output of the second differential amplifier, the output of the said detector being connected to the switch element.

2. An apparatus as claimed in claim 1, characterized in that the threshold value detector is formed by a Schmitt trigger followed by a pulse generator which is capable of transmitting pulses to the switch element.

3. An apparatus as claimed in claim 2, characterized in that the length and shape of the pulses from the pulse generator can be preset and controlled.

* * * * *